Figure 1:
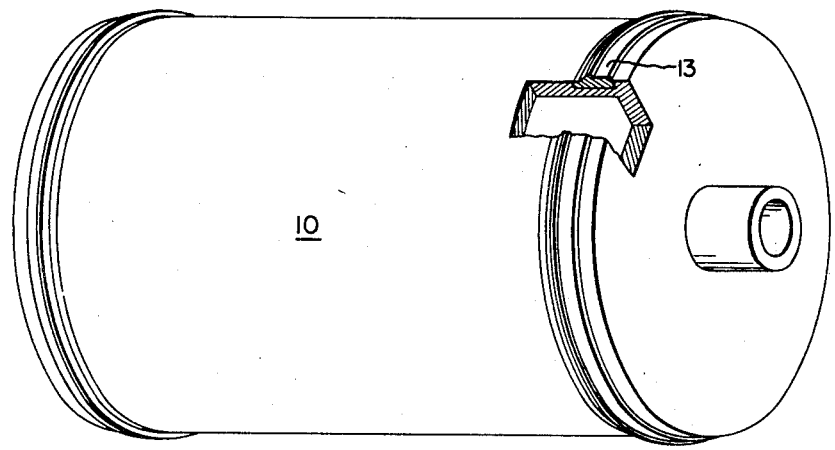

Dec. 27, 1960

M. M. SMITH ET AL 2,965,923

ROTARY MOLDING MACHINES

Filed July 29, 1957

INVENTORS
Merrill M. Smith & Thomas M. Knowland
BY
Kenway, Jenney, Witter & Hildreth
Attys.

United States Patent Office 2,965,923
Patented Dec. 27, 1960

2,965,923
ROTARY MOLDING MACHINES

Merrill M. Smith, Yardley, Pa., and Thomas M. Knowland, Belmont, Mass., assignors to American Biltrite Rubber Co., Inc., Chelsea, Mass., a corporation of Delaware Filed July 29, 1957, Ser. No. 674,966

4 Claims. (Cl. 18—6)

This invention relates to rotary molding machines of the "Rotocure" type shown, for example, in United States Letters Patent No. 2,351,861, June 20, 1944. These machines include in their organization a heated rotary steel drum and a cooperating pressure band which encircles a substantial portion of the arcuate surface of the drum. The rubber or plastic elastomer to be molded is passed about the heated drum and molded in its passage under pressure exerted by the band.

In producing continuous sheets a supply or feed of unmolded material in either sheet or granular form is fed to the bite of the machine and is compacted into a homogeneous sheet of the desired predetermined width and thickness. Since the molding is done under heavy pressure there is a tendency for the material to be forced laterally out from between the heated drum and the pressure band with a consequent loss of thickness and density of the product. It has been heretofore necessary, therefore, to trim a wide strip of waste material from each edge of the strip.

In the endeavor to prevent this loss of edge material and insure the requisite density throughout the strip, edge rings have been attached to the arcuate surface of the drum in such a manner as to retain the unmolded material while passing under pressure about the surface of the drum. These rings as heretofore used have been unsatisfactory, particularly when plastic granules are used as feed material because they have not allowed a firm densification of the product or provided properly for draft of the material. Furthermore, they have tended to trap air and so render the edge portions of the product objectionably porous.

We have discovered that the molding difficulties mentioned above may be obviated by employing spaced parallel edge forming rings secured to the arcuate surface of the drum and having outwardly inclined or sloping faces which permit lateral draft of the marginal material during the molding process, facilitate the escape of entrained air and form in the product a perfectly molded edge which is compact, dense, and without porosity. Preferably and as herein shown, the inclined edge faces of the rings are bounded by outwardly projecting ribs which define outer circular recesses into which the waste material may freely flow.

A partial explanation of the effectiveness of this new ring configuration is that the component band pressure is exerted directly and obliquely against the inclined ring surface rather than parallel to an upright bounding surface. Accordingly, a much higher compacting and consolidating pressure is applied to the material and the presence of trapped air in the finished product is eliminated since all the air beneath the band is forced outwardly along the inclined molding face of the ring. The resulting product emerges with a clearly defined dense edge and with a minimum amount of waste material requiring treatment.

Figure 2:
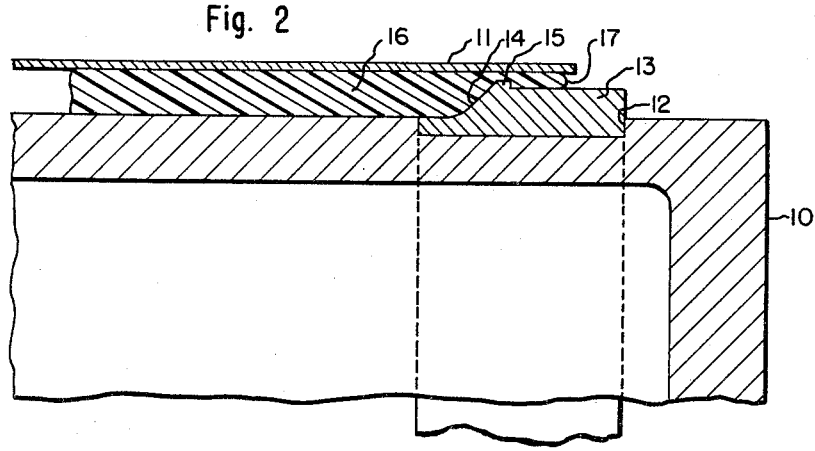

These and other features of the invention will be best understood and appreciated from the following description of a preferred embodiment thereof, selected for purposes of illustration and shown in the accompanying drawings in which:

Fig. 1 is a view in perspective of the drum showing a portion thereof broken away, and Fig. 2 is a cross-sectional view on a larger scale of a portion of the drum.

The drum 10 and the pressure band 11 herein shown are of the construction of the corresponding elements shown in greater detail in Letters Patent No. 2,351,861 and are organized and operated as therein shown. The drum 10 is provided with a pair of spaced parallel channels 12 that extend below its arcuate surface, one adjacent to each end of the drum and spaced in accordance with the desired width of the molded product. Into each of these channels is fitted a circular metal ring 13 having a rectangular base which fills the channel so positively interlocking the ring with the metal of the drum. The inner portion of the ring is shaped as a flat flange which is flush with the arcuate surface of the drum. This flange merges into an upwardly and outwardly inclined edge molding surface 14 herein shown as making about 45° with the drum surface. It will be seen that the two inclined ring surfaces are opposed and divergent in their relation to each other and provide for outward draft of the molded material as forced against them by the pressure of the band 11.

The inclined annular face of each ring is bounded by a projecting rib 15 and this defines the inner edge of an outer circular recess into which the waste material 17 from the molded strip 16 may find its way. Preferably the band 11 is of sufficient width to overlap at least a portion of the rings 13 as indicated in Fig. 2.

We have found that in operation the marginal edge portions of the molded strip 16 which contact the annular inclined faces 14 of the metal molding rings are solidly compacted and molded into definite shape of homogeneous consistency. The ribs 15, moreover, mold into the margins of the strip continuously narrow channels that serve as convenient and accurate gauges for subsequently trimming off the waste material which is forced outwardly beyond the ribs into the circular recesses in the outer surface of the rings. Moreover the inclined and divergent ring surfaces permit and direct all the air originally trapped in the mass of granules to escape by lateral flow from the product beneath the band 11.

It will be understood that the drum is usually heated by internal heaters or by steam, while the pressure band 11 is also heated by external heaters located in close proximity. The elastomer is therefore heat cured or vulcanized in its passage about the drum simultaneously with the molding operation to which it is subjected.

Having thus disclosed our invention and described in detail illustrative apparatus for carrying it out, we claim as new and desire to secure by Letters Patent:

1. A rotary molding machine in which the drum is provided with a pair of edge-forming rings, said rings each having an upstanding rib, each ring extending smoothly upwardly and outwardly from the surface of the drum to the top of each rib of each ring, said rings being located adjacent the side edges of said drum and being spaced therefrom, a pressure band encircling said drum, extending laterally from one rib to the other rib and overlapping each rib, whereby consolidated pressure may be exerted on the plastic material on said drum to force gas outwardly on both sides of said drum and between each of the ribs and portions of the presusre band which overlie said ribs.

2. The structure of claim 1 wherein said drum is provided with a circumferential recess adjacent the sides thereof for the reception of each ring.

3. The structure of claim 1 wherein said ribs are provided with annular circular recesses between the rib of each ring and the side edges of the drum into which waste moldable material may flow.

4. The process of simultaneously curing and molding an elastomeric sheet from plastic granules containing air trapped in the mass, comprising the steps of progressively subjecting the granules to heat and rolling pressure and at the same time confining the marginal edges of the treated elastomeric material by means of an outwardly inclined and rigid edge-molding surfaces, applying consolidating pressure uniformly to the exposed surface and extending to the marginal portions of the material, thereby compressing material and causing the same to flow outwards over said marginal edges of said rings whereby the air in said material is forced laterally from the material over said edges to produce a consolidated sheet between said edges free from entrapped air.

References Cited in the file of this patent

UNITED STATES PATENTS

| | | |
|---|---|---|
| 39,916 | Heissenbuttel | Sept. 15, 1863 |
| 1,999,796 | Zinser | Apr. 30, 1935 |
| 2,159,543 | Baker | May 23, 1939 |
| 2,240,251 | Baker et al. | Apr. 29, 1941 |

FOREIGN PATENTS

| | | |
|---|---|---|
| 373,441 | Germany | Apr. 12, 1923 |